US011738731B2

(12) United States Patent
Roether et al.

(10) Patent No.: US 11,738,731 B2
(45) Date of Patent: Aug. 29, 2023

(54) GUIDE SLEEVE FOR GUIDING A COLLAR OF A RELAY VALVE FOR AN ELECTROPNEUMATIC MODULATOR

(71) Applicant: Knorr-Bremse Systeme Fuer Nutzfahrzeuge GmbH, Munich (DE)

(72) Inventors: Friedbert Roether, Cleebronn (DE); Martin Krahl, Ludwigsburg (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 133 days.

(21) Appl. No.: 17/272,438

(22) PCT Filed: Aug. 5, 2019

(86) PCT No.: PCT/EP2019/070964
§ 371 (c)(1),
(2) Date: Mar. 1, 2021

(87) PCT Pub. No.: WO2020/048706
PCT Pub. Date: Mar. 12, 2020

(65) Prior Publication Data
US 2021/0316707 A1 Oct. 14, 2021

(30) Foreign Application Priority Data
Sep. 6, 2018 (DE) .......................... 102018121718.8

(51) Int. Cl.
*B60T 15/02* (2006.01)
*F16K 31/42* (2006.01)

(52) U.S. Cl.
CPC ............ *B60T 15/027* (2013.01); *F16K 31/42* (2013.01)

(58) Field of Classification Search
CPC ...... B60T 13/683; B60T 15/027; B60T 15/00; B60T 15/182; B60T 17/00; F16K 31/42; F16K 31/1221
(Continued)

(56) References Cited

U.S. PATENT DOCUMENTS 3,907,379 A 9/1975 Lawson
5,253,930 A * 10/1993 Maruta ................ B60T 13/683
303/3

(Continued)

FOREIGN PATENT DOCUMENTS

CN 1413863 A 4/2003
CN 1503744 A 6/2004
(Continued)

OTHER PUBLICATIONS

English machined translation of ES-1033579, Sep. 16, 1996.*
International Search Report dated Oct. 31, 2019 for PCT/EP2019/070964.

*Primary Examiner* — Robert A. Siconolfi
*Assistant Examiner* — San M Aung
(74) *Attorney, Agent, or Firm* — Norton Rose Fulbright US LLP; Gerard Messina; Aaron Deditch

(57) ABSTRACT

A guide sleeve for guiding a collar of a relay valve for an electropneumatic modulator for a brake system for a vehicle, includes: a guide section configured to be couple-able to a counterpart guide section of the collar of the relay valve so as to allow guidance of the collar along the guide section; and a holding section configured to fasten the guide sleeve in a positively locking manner in a housing of the relay valve. Also described are a related guide sleeve device, and a relay valve, and a related method.

13 Claims, 6 Drawing Sheets

(58) Field of Classification Search
USPC .............................. 182/152; 303/3, 40, 118.1
See application file for complete search history.

(56) References Cited

U.S. PATENT DOCUMENTS

| | | | |
|---|---|---|---|
| 7,059,688 | B2 | 6/2006 | Roether et al. |
| 2004/0084090 | A1* | 5/2004 | Roether ................ B60T 15/027 |
| | | | 137/495 |
| 2004/0183363 | A1* | 9/2004 | Roether .................. B60T 8/362 |
| | | | 303/7 |
| 2004/0232367 | A1* | 11/2004 | Roether .................. B60T 15/18 |
| | | | 251/30.01 |
| 2016/0236667 | A1* | 8/2016 | Sieker ................... B60T 15/182 |
| 2019/0193706 | A1* | 6/2019 | Roether ................ B60T 15/027 |

FOREIGN PATENT DOCUMENTS

| | | |
|---|---|---|
| CN | 101372224 A | 2/2009 |
| CN | 104192136 A | 12/2014 |
| DE | 2918032 A1 | 11/1980 |
| DE | 10120322 C1 | 10/2002 |
| DE | 102009029968 A1 | 12/2010 |
| DE | 102014009179 A1 | 12/2015 |
| EP | 2266854 A2 | 12/2010 |
| EP | 2407355 A1 | 1/2012 |
| ES | 1033579 U | 9/1996 |
| WO | 2015058828 A1 | 4/2015 |

* cited by examiner

A-A

GUIDE SLEEVE FOR GUIDING A COLLAR OF A RELAY VALVE FOR AN ELECTROPNEUMATIC MODULATOR

FIELD OF THE INVENTION

The present approach relates to a guide sleeve for guiding a collar of a relay valve for an electropneumatic modulator for a brake system for a vehicle, to a guide sleeve device having a guide sleeve, to a relay valve having a guide sleeve device, and to a method for producing a relay valve.

BACKGROUND INFORMATION

Relay valves exist in the case of which a collar of the relay valve is guided on two hollow cylinders which are formed by a plastics part such as a guide sleeve. Assembly of a sealing element and of the collar and an alignment process are performed by an assembly tool from a top side of a module of a two-part housing. A fastening of the guide sleeve in the housing is realized by a securing ring in the housing.

SUMMARY OF THE INVENTION

Against this background, it is an object of the present approach to create an improved guide sleeve for guiding a collar of a relay valve for an electropneumatic modulator for a brake system for a vehicle, a guide sleeve device having an improved guide sleeve, a relay valve having an improved guide sleeve device, and a method for producing an improved relay valve.

The object may be achieved by a guide sleeve for guiding a collar of a relay valve for an electropneumatic modulator for a brake system for a vehicle, a guide sleeve device having a guide sleeve, a relay valve having a guide sleeve device and a method for producing a relay valve, according to the main descriptions herein.

The advantages achievable with the proposed approach consist in that a guide sleeve for a relay valve is created, which is formed both so as to guide a collar which is movable by a relay piston and so as to be fastened securely and easily in a housing of the relay valve. A guide sleeve proposed here is furthermore advantageously formed for use with, and for assembly in, a unipartite housing of the relay valve.

A guide sleeve for guiding a collar of a relay valve for an electropneumatic modulator for a brake system for a vehicle comprises a guide section and a holding section. The guide section is formed so as to be couplable to or in a counterpart guide section of the collar of the relay valve in order to allow guidance of the collar along the guide section. The holding section is formed so as to fasten the guide sleeve in a housing of the relay valve in a positively locking manner.

The collar may, in an operational state of the relay valve, be formed and arranged so as to close an opening of the relay valve. By a movement of a relay piston of the relay valve against the collar, the collar can be moved along the guide section of the guide sleeve in order to open the relay valve. For this purpose, the collar may, in the operational state of the relay valve, be arranged between the relay piston and the guide sleeve. Between the collar and the guide sleeve, there may be braced a collar spring which is configured to cause a closure of the relay valve when the relay piston is arranged spaced apart from the collar. The guide sleeve itself may furthermore serve as a closure of the relay valve. The holding section may for example be formed so as to fasten the guide sleeve in a positively locking manner in an undercut of the housing of the relay valve. For this purpose, an outer diameter of the holding section may be larger than, for example more than twice as large as, an outer diameter of the guide section. A guide sleeve proposed here advantageously allows a dual function of a guide sleeve, wherein, on the one hand, the collar can be guided in a centered manner along the guide sleeve and, on the other hand, a fastening of the guide sleeve in the housing is made possible.

For example, the holding section may form at least one detent hook and additionally or alternatively one bayonet. Such a detent hook and additionally or alternatively a bayonet can engage with detent action or snap into the housing, for example into the undercut of the housing, in order to allow a secure connection. Here, the detent hook and additionally or alternatively the bayonet may be formed so as to prevent the guide sleeve from sliding out counter to a direction of introduction of the guide sleeve into the housing during an assembly of the guide sleeve. It is thus possible for a stable fastening in a tubular housing to be made possible. The detent hook in this case allows a permanent or non-releasable connection, whereas the bayonet can allow a releasable connection.

According to one embodiment, the guide section and the holding section extend to two opposite sides of the guide sleeve. Here, the guide section and the holding section may be formed integrally on two opposite ends of the guide sleeve. It is thus possible for the collar and the relay piston to be guided to one side of the guide sleeve and for the relay valve to be closed by the holding section to the opposite side.

It is advantageous here if the guide sleeve, according to one embodiment, forms a central section which is arranged between the guide section and the holding section and which may be of substantially circular-ring-shaped or hollow frustoconical form. The central section may serve for connecting the guide section to the holding section. The central section may in this case extend substantially perpendicularly with respect to an axis of extent of the guide section, or may extend obliquely away from the guide section. In a tubular housing, the housing or the relay valve can thus be closed by the central section. If the central section has the form of a hollow frustum or of a funnel, this can create a space in the frustum or funnel. The space may be formed between the guide sleeve and a silencer which is arranged or arrangeable oppositely in relation to the collar, in order that air can expand into the space before flowing out through the silencer.

For example, the holding section may be formed on a bottom side of the central section and, in addition or alternatively, the guide section may be formed on a top side, situated opposite the bottom side, of the central section. The holding section may in this case extend from an edge section of the bottom side of the central section, and, in addition or alternatively, the guide section may extend from a substantially central region of the top side of the central section. A fastening of the guide sleeve to an inner wall of the housing, and centered guidance of the collar, are thus made possible.

It is furthermore advantageous if, according to one embodiment, the guide sleeve has at least one axial rib which extends away from a bottom side, facing toward the holding section, of the central section and which additionally or alternatively has an extent axis arranged so as to run parallel to the guide section. The axial rib may be of rod-like form. Such an axial rib may be formed so as to, in the operational state of the relay valve with a silencer, project into the silencer or press into the latter in order to increase stability of the guide sleeve and additionally or alternatively reduce a flow of air in the space to the housing. The guide sleeve may also have a multiplicity of such axial ribs, which may be arranged in a ring shape.

In addition or alternatively, the guide sleeve may have at least one radial rib which may extend radially between a sleeve passage opening of the guide sleeve and the holding section on a bottom side, facing toward the holding section, of the central section. Such a radial rib can advantageously reduce air turbulence that arises in the space. The guide sleeve may also have a multiplicity of such radial ribs, which may be arranged so as to run radially around the sleeve passage opening.

The guide section may form an outer sleeve and an inner sleeve which is enclosed by the outer sleeve, wherein the inner sleeve may surround a sleeve passage opening of the guide sleeve. It is thus possible for the outer sleeve and additionally or alternatively the inner sleeve to be plugged or introduced into the counterpart guide section of the collar during the coupling to the collar. The counterpart guide section may be formed similarly to the guide section.

According to one advantageous embodiment, the guide sleeve is of unipartite and additionally or alternatively altogether funnel-shaped form. Such a unipartite guide sleeve is easily producible for example by injection molding, and in the process requires little material and costs in the production process.

A guide sleeve device has a guide sleeve in one of the variants proposed above and has the collar, wherein an inner diameter of the collar is equal to or smaller than an inner diameter of the guide section of the guide sleeve. Such a guide sleeve device can advantageously, owing to the mutually adapted inner diameters of the guide section and the collar, be assembled concomitantly into the housing from one side, using a single assembly tool and in a single assembly step, during an assembly process. This is advantageous in particular if the housing of the relay valve is also of unipartite form and the relay valve components which are arrangeable in a receiving chamber of the housing are stacked into the receiving chamber in succession from one side during an assembly of the relay valve. The counterpart guide section of the collar and the guide section may, for this purpose, be formed so as to seal off a gap between the counterpart guide section and the guide section. Here, one end of the counterpart guide section may form a sealing element which, in the coupled state of the guide section on or in the counterpart guide section, can bear against the guide section, and, in addition or alternatively, close contact can prevail in the coupled state of the guide section on or in the counterpart guide section.

A relay valve has a housing, has a guide sleeve device which is arrangeable or arranged in the housing and which is formed in one of the variants proposed above, and has a relay piston, which is arrangeable or arranged in the housing, for the purposes of moving the collar along the guide section of the guide sleeve. The housing may be of unipartite form. The relay piston and the guide sleeve device may be received in a receiving chamber of the relay piston. Such a relay valve advantageously has very few components and is easy to assemble.

A method for producing a relay valve comprises a step of providing, a step of inserting and a step of introducing. In the step of providing, a housing, a relay piston and a guide sleeve device formed in one of the variants proposed above are provided. In the step of inserting, the relay piston is inserted into the housing. In the step of introducing, the guide sleeve device is introduced into the housing, wherein the guide sleeve device is introduced into the housing such that the guide section of the guide sleeve is coupled to the counterpart guide section of the collar and the holding section of the guide sleeve is fastened in a positively locking manner in the housing.

Exemplary embodiments of the approach proposed here will be discussed in more detail in the following description with reference to the figures.

DETAILED DESCRIPTION

In the following description of expedient exemplary embodiments of the present approach, identical or similar reference designations are used for the elements of similar action that are illustrated in the various figures, wherein a repeated description of these elements will not be given.

Figure 1:
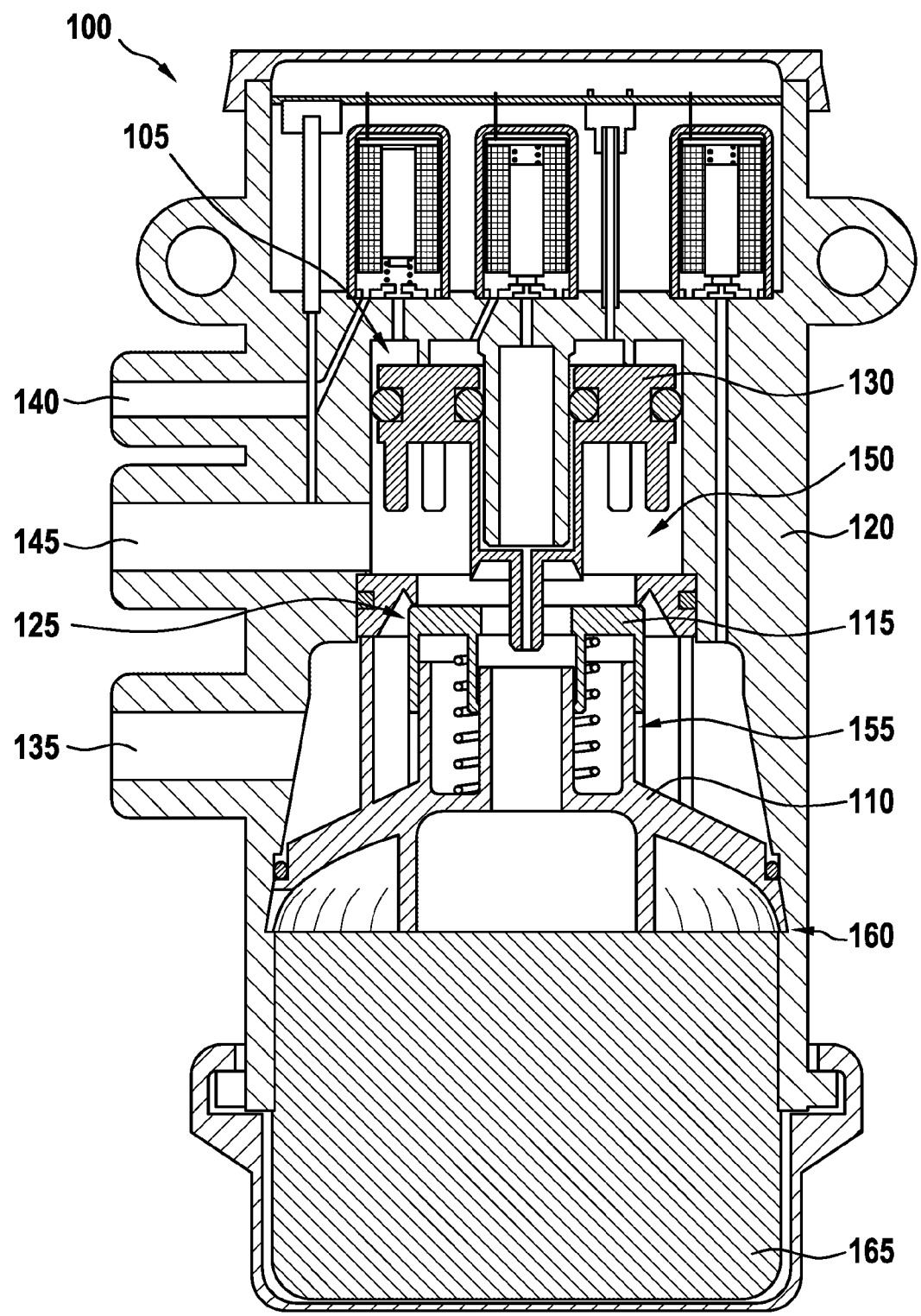
FIG. 1 shows a schematic lateral cross-sectional illustration of an electropneumatic modulator having a relay valve with a guide sleeve for guiding a collar of the relay valve, according to an exemplary embodiment.

FIG. 1 shows a schematic lateral cross-sectional illustration of an electropneumatic modulator 100 having a relay valve 105 with a guide sleeve 110 for guiding a collar 115 of the relay valve 105, according to an exemplary embodiment.

The electropneumatic modulator 100 is formed for use for an electropneumatic brake system for a vehicle and, in an operational state illustrated here, is configured to regulate a provided pneumatic brake pressure, that is to say compressed air, during a braking operation of the vehicle.

Merely by way of example, the relay valve 105 according to this exemplary embodiment is part of the electropneumatic modulator 100. The relay valve 105 comprises a housing 120, a guide sleeve device 125 which is arrangeable or arranged in the housing 120, and a relay piston 130 which is arrangeable or arranged in the housing 120. The guide sleeve device 125 comprises the guide sleeve 110 and the collar 115. In this exemplary embodiment, the relay valve 105 is arranged in an operational state in which the relay piston 130 and the guide sleeve device 125 are received in the housing 120. In this exemplary embodiment, the collar 115 is arranged between the relay piston 130 and the guide sleeve 110.

An exemplary function of the electropneumatic modulator 100 will be described below:

In one exemplary embodiment, the electropneumatic modulator 100 is part of the brake system of the vehicle. In one exemplary embodiment, the brake system comprises not only the modulator 100 but also a reservoir for providing compressed air, a control device for providing an electrical control signal, a footbrake device for providing a pneumatic control signal and/or a wheel brake device for braking a wheel of the vehicle. The functionality of the modulator 100 corresponds, in one exemplary embodiment, to the functionality of known electropneumatic modulators used in conjunction with brake systems. In this exemplary embodiment, the electropneumatic modulator 100 has an electrical control input for receiving the electrical control signal from the control device, a reservoir connection 135 for the supply of compressed air from the reservoir, a pneumatic control inlet 140 for the supply of compressed air from the reservoir in response to the pneumatic control signal, and a brake outlet 145 for outputting a brake pressure to the wheel brake device. The wheel brake device may be configured correspondingly to a brake that is conventional in the automotive sector, and may for example comprise a brake cylinder which is actuatable by the brake pressure. In one exemplary embodiment, the electrical control signal represents an electrical signal. For example, the electrical control signal may indicate a demanded setpoint brake pressure. In this case, the control device is configured for example as a brake control unit, and the electropneumatic modulator 100 comprises, for example, at least one solenoid valve which is actuatable using the electrical control signal or a signal generated in response to a receipt of the electrical control signal. In this exemplary embodiment, the relay piston 130 and the guide sleeve device 125 are received one above the other in a receiving chamber 150 of the housing 120. The brake outlet 145 and the reservoir 135 open into the receiving chamber 150. The relay valve 105 is configured and formed so as to open or close a fluidic connection between the reservoir connection 135 and the brake outlet 145 by way of a movement of the relay piston 130. The receiving chamber 150 comprises a control chamber section which, in a manner controlled by the electrical control signal, can be charged with supplied compressed air in order to effect a switching movement of the relay piston 130. In one exemplary embodiment, the receiving chamber 150 furthermore comprises a working chamber section which is fluidically connected to the brake outlet 145 and which can, by the switching movement of the relay piston 130, be charged with compressed air supplied via the reservoir connection 135 in order to provide the brake pressure at the brake outlet 145.

The guide sleeve 110 proposed here is, in this exemplary embodiment, received in or on the relay valve 105. The guide sleeve 110 is formed so as to guide the collar 115 of the relay valve 105 and/or fasten the collar in the housing 120. For this purpose, the guide sleeve 110 comprises a guide section 155 and a holding section 160. The guide section 155 is formed so as to be couplable to or in a counterpart guide section of the collar 115 of the relay valve 105 in order to allow guidance of the collar 115 along the guide section 110. In this exemplary embodiment, a collar spring is braced between the collar and the guide section 110.

The holding section 160 is formed so as to fasten the guide sleeve 110 in the housing 120 of the relay valve 105 in a positively locking manner.

In this exemplary embodiment, the relay valve 105 is arranged in an operational state in which the guide section 155 of the guide sleeve 110 is arranged so as to be coupled to or in the counterpart guide section of the collar 115 and the holding section 160 of the guide sleeve 110 is fastened in a positively locking manner in the housing 120. In this exemplary embodiment, the relay valve 105 is arranged in a closed state, in which the reservoir connection 135 and the brake outlet 145 are not fluidically connected to one another. The relay piston 130 is in this case arranged spaced apart from the collar 115 and thus does not move this along the guide section 155. The relay piston 130 of the relay valve 105 is formed so as to move the collar 115 along the guide section 155 of the guide sleeve 110 in order to effect an opening of the relay valve 105.

In this exemplary embodiment, a silencer 165 is arranged on a side, facing toward the holding section 160, of the guide sleeve 110. In one exemplary embodiment, the silencer 165 is part of the relay valve 105 and/or is arranged at least partially in the housing 120.

Figure 2:
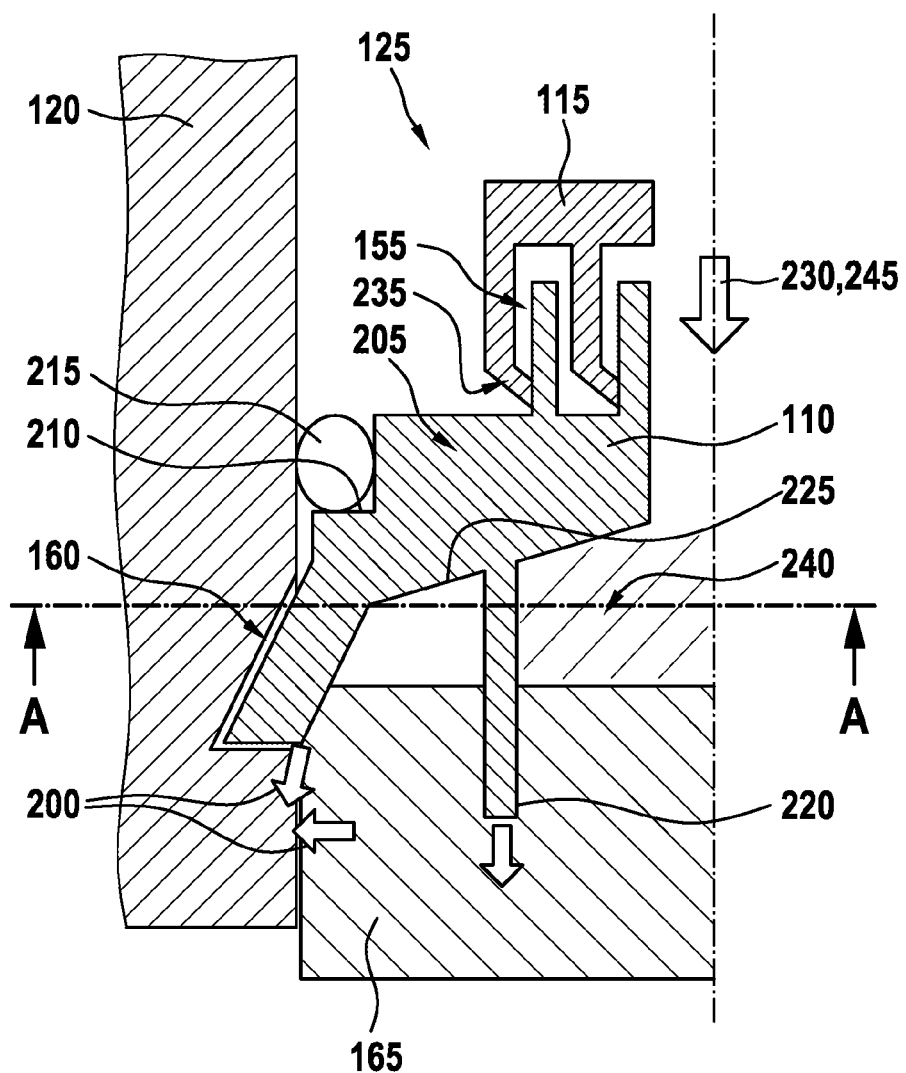
FIG. 2 shows a detail of a lateral cross-sectional illustration of a guide sleeve device according to an exemplary embodiment.

FIG. 2 shows a detail of a lateral cross-sectional illustration of a guide sleeve device 125 according to an exemplary embodiment. This may be the guide sleeve device 125 described in FIG. 1, in the case of which the guide sleeve 110 and the collar 115 are coupled to one another. The housing 120 may also be the housing 120 described in FIG. 1, and the silencer 165 may be the silencer 165 described in FIG. 1. The illustration in FIG. 2 shows only one of two halves of the cross section. Another half, which is not illustrated, may be formed correspondingly to the half shown here.

In this exemplary embodiment, the holding section 160 forms at least a detent hook or, according to an alternative exemplary embodiment, a bayonet. In this exemplary embodiment, the detent hook is engaged with detent action in an undercut of the housing 120. In this exemplary embodiment, the detent hook, which can also be referred to as a lateral snap-action rib, causes a radial compression of the silencer 165 or, in other words, a radial external pressure 200 on the silencer 165.

In this exemplary embodiment, the guide section 155 and the holding section 160 extend to two opposite sides of the guide sleeve 110. An extent axis of the guide section 155 runs in this case parallel to a provided movement axis of the relay piston and/or to an extent axis of an inner wall of the housing 120. An extent axis of the holding section 160 in the form of the detent hook is arranged so as to run obliquely with respect to the extent axis of the guide section 155. In this exemplary embodiment, between the guide section 155 and the holding section 160, the guide sleeve 110 forms a central section 205, which is of substantially circular-ring-shaped or hollow frustoconical form. In this exemplary embodiment, the central section 205 is of circular-ring-shaped form, and FIG. 1 illustrates a hollow frustoconical configuration of the central section 205. In this exemplary embodiment, the holding section 160 extends from a bottom side of the central section 205, and the guide section 155 extends from a top side, situated opposite the bottom side, of the central section 205. In this exemplary embodiment, the holding section 160 extends away from an outer edge section of the bottom side and/or the guide section 155 extends away from a substantially central region of the top side. In this exemplary embodiment, between the top side and the edge section, the central section 205 has a step 210 in which there is received a sealing element 215 which is formed so as to seal the guide sleeve 110 against the housing 120. In this exemplary embodiment, the sealing element 215 is a sealing ring which is arranged in a step 210 which runs in an encircling manner.

In this exemplary embodiment, the guide sleeve 110 has at least one axial rib 220 which extends away from the bottom side, facing toward the holding section 160, of the central section 205. In this exemplary embodiment, an extent axis of the axial rib 220 is arranged so as to run parallel to the guide section 155. In this exemplary embodiment, an extent length of the axial rib 220 is longer than an extent length of the detent hook. In this exemplary embodiment, the axial rib 220 extends away from a central region of a radius of the central section 205 and/or makes possible an axial pressure in the silencer 165.

In this exemplary embodiment, the guide sleeve 110 has at least one radial rib 225 which extends radially between a sleeve passage opening 230 of the guide sleeve 110 and the holding section 160 on the bottom side of the central section 205. In this exemplary embodiment, the radial rib 225 runs obliquely or in a wedge shape from the sleeve passage opening 230 toward the holding section 160. In one exemplary embodiment, the axial rib 220 is arranged on the radial rib 225.

In this exemplary embodiment, the guide section 155 forms an outer sleeve and an inner sleeve which is enclosed by the outer sleeve, wherein the inner sleeve surrounds the sleeve passage opening 230 of the guide sleeve 110. An inner diameter of the collar 115 is in this exemplary embodiment equal to, or in an alternative exemplary embodiment smaller than, an inner diameter of the guide section 155 of the guide sleeve 110. In this exemplary embodiment, the counterpart guide section 235 of the collar 115 and the guide section 155 are formed so as to seal off a gap between the counterpart guide section 235 and the guide section 155. In this exemplary embodiment, the counterpart guide section 235 lies on or in a respective outer wall of the inner sleeve and of the outer sleeve.

In this exemplary embodiment, the guide sleeve 110 is of unipartite and/or altogether funnel-shaped form.

Exemplary embodiments of the guide sleeve device 125 or of the guide sleeve 110 will be described once again below in more detail with different wording:

The guide sleeve 110 proposed here may also be referred to as a guide sleeve 110 with snap-action geometry. It is an object of the guide sleeve 110 to form the guide for the collar 115. In this exemplary embodiment, the guide sleeve device 125 realizes mutually adapted collar and guide sleeve inner diameters. Assembly of the guide sleeve device 125 into the housing 120 is now advantageously possible from below, because the collar 115 can be aligned with the guide sleeve 110 by an assembly tool; in this regard, see also the assembly tool in FIG. 4. Such assembly from below is a basic prerequisite for a housing 120 which is closed in an upper region, in this exemplary embodiment a unipartite housing 120, which contributes to cost savings.

It is a further object of the guide sleeve 110 to accommodate pneumatic forces and form a closed pressure region. Owing to the detent engagement of the snap-action geometry of the guide sleeve 110 in the housing 120, it is advantageously made possible for an additional securing ring to be omitted, and, additionally, advantageously very little assembly outlay is required. In one exemplary embodiment, the detent hook is non-releasably engaged with detent action in the housing 120. An advantage furthermore lies in the fact that no inadmissible substitute parts can be installed, because removal of the guide sleeve 110 is not possible without destruction.

It is a further object of the guide sleeve 110 to guide air to the silencer 165 during a ventilation operation. This object is achieved by the guide sleeve 165 by virtue of a space 240 being created above the fabric of the silencer 165, in which space the air can expand before flowing out from the silencer 165. The lateral ribs in the form of the radial ribs 225 in the space 240 ensure that air turbulence that is generated is reduced. The holding section 160 in the form of lateral snap-action ribs causes the radial compression 200 of the knit, and a bypassing flow of the air between the housing 120 and the silencer 165 is thus prevented in an effective manner. Also acting is an axial compressing rib in the form of the axial rib 220, which reduces an air flow 245 in the direction of the housing 120.

An assembly of the guide sleeve device 125 and/or an alignment is advantageously made possible by a single assembly tool from a bottom side of the housing 120. The relay valve or even the entire electropneumatic modulator can thus advantageously be arranged in assembled form, or assembled, into a unipartite housing 120, see also FIG. 1. Additional components such as a securing ring for fastening the guide sleeve 110 or the entire relay valve in the housing 120 are advantageously not required owing to the holding section 160. Owing to the oblique form of the holding section 160, it is the case in this exemplary embodiment that the space 240 is created between the bottom side of the central section 205 and the silencer 165, which space allows damping of an air flow 245 which flows through the sleeve passage opening 230 to the silencer 165. An additional damping plate with holes between the guide sleeve 110 and the silencer 165 is thus not required. In an alternative exemplary embodiment, such a damping plate with holes is nevertheless arranged between the guide sleeve 110 and the silencer 165 in order to realize even more intense damping of the air flow 245. Owing to the compressive action of the holding section 160 on the silencer 165, there is furthermore no need for additional circular compression in the fabric of the silencer 165 between the housing 120 and the silencer 165 in order to prevent a bypassing flow laterally past the fabric. This object is also achieved by the holding section 160. In an alternative exemplary embodiment, additional compression of the fabric of the silencer 165 is realized by a further step in the housing 120.

In an alternative exemplary embodiment, it is also the case that an inner diameter of the guide sleeve 110 is reinforced by ribs and/or webs, wherein a slotted assembly tool can be used for the purposes of assembly. A collar which, according to an alternative exemplary embodiment, is smaller in terms of inner diameter than the guide sleeve 110 can be centered by a stepped assembly tool. According to an alternative exemplary embodiment, the space 240 is at least partially formed by the housing 120, in the form of a cast housing, itself.

Figure 3:
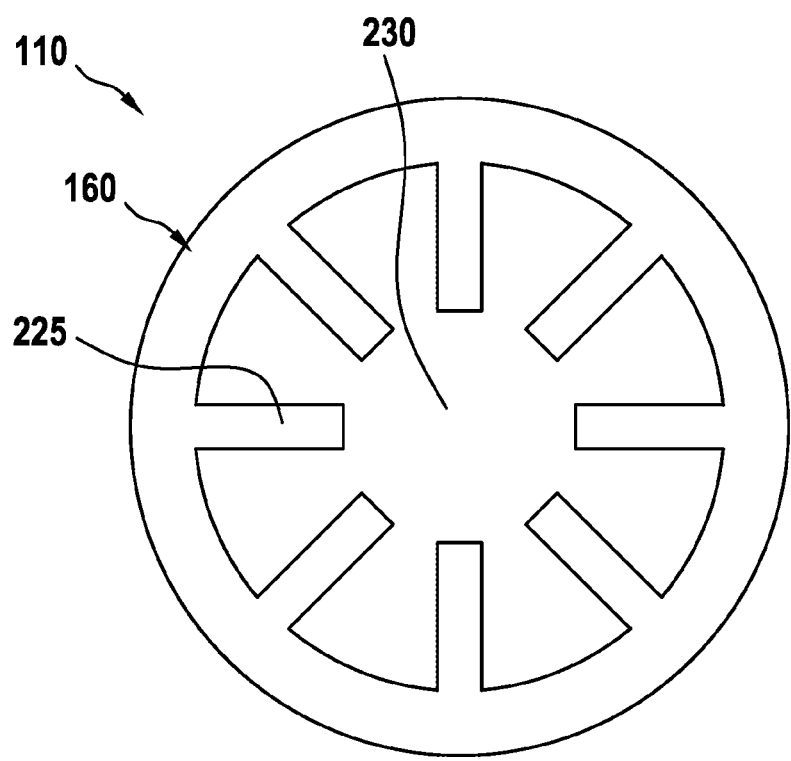
FIG. 3 shows a schematic cross-sectional illustration of a bottom side of a guide sleeve according to an exemplary embodiment.

FIG. 3 shows a schematic cross-sectional illustration of a bottom side of a guide sleeve 110 according to an exemplary embodiment. This may be an exemplary embodiment of the guide sleeve 110 described in FIG. 1 or FIG. 2.

In this exemplary embodiment, the bottom side of the guide sleeve 110 has a multiplicity of radial ribs 225 which are arranged radially around the sleeve passage opening 230. In this exemplary embodiment, the bottom side has eight of the radial ribs 225, which are arranged so as to be uniformly spaced apart from one another.

In this exemplary embodiment, the holding section 160 is arranged in an encircling manner on a peripheral edge of the central section, or a multiplicity of detent hooks which form the holding section 160 is arranged in an encircling manner on encircling edge sections of the peripheral edge. In one exemplary embodiment, twenty such detent hooks form the holding section 160. In one exemplary embodiment, it is also the case that a multiplicity of the axial ribs are arranged on the bottom side, in one exemplary embodiment eight of the axial ribs, which, in one exemplary embodiment, are arranged so as to be uniformly spaced apart from one another and/or in a ring shape and thus, in one exemplary embodiment, allow axial circular pressure in the silencer.

Figure 4:
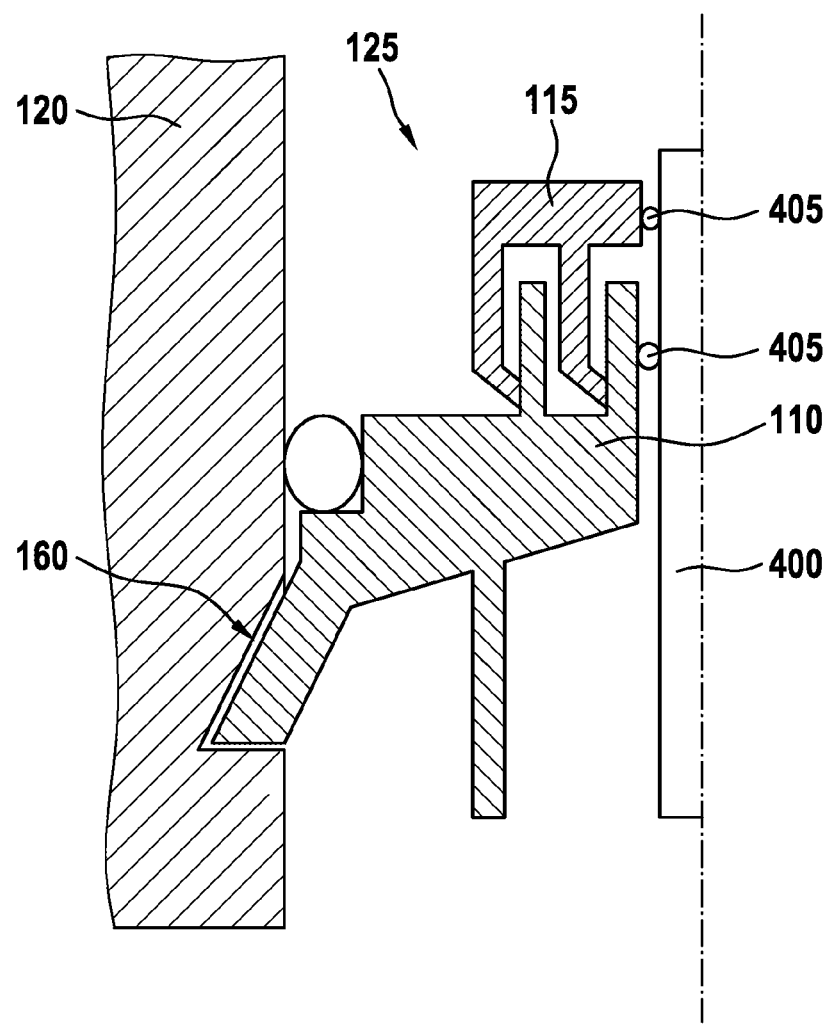
FIG. 4 shows a detail of a lateral cross-sectional illustration of a guide sleeve device according to an exemplary embodiment.

FIG. 4 shows a detail of a lateral cross-sectional illustration of a guide sleeve device 125 according to an exemplary embodiment. This may be the section described in FIG. 2, wherein, in this exemplary embodiment, the guide sleeve device 125 is illustrated during assembly onto the housing 120 by an assembly tool 400. In this exemplary embodiment, two guide surfaces 405 and/or an alignment means are arranged on one axis.

Figure 5:
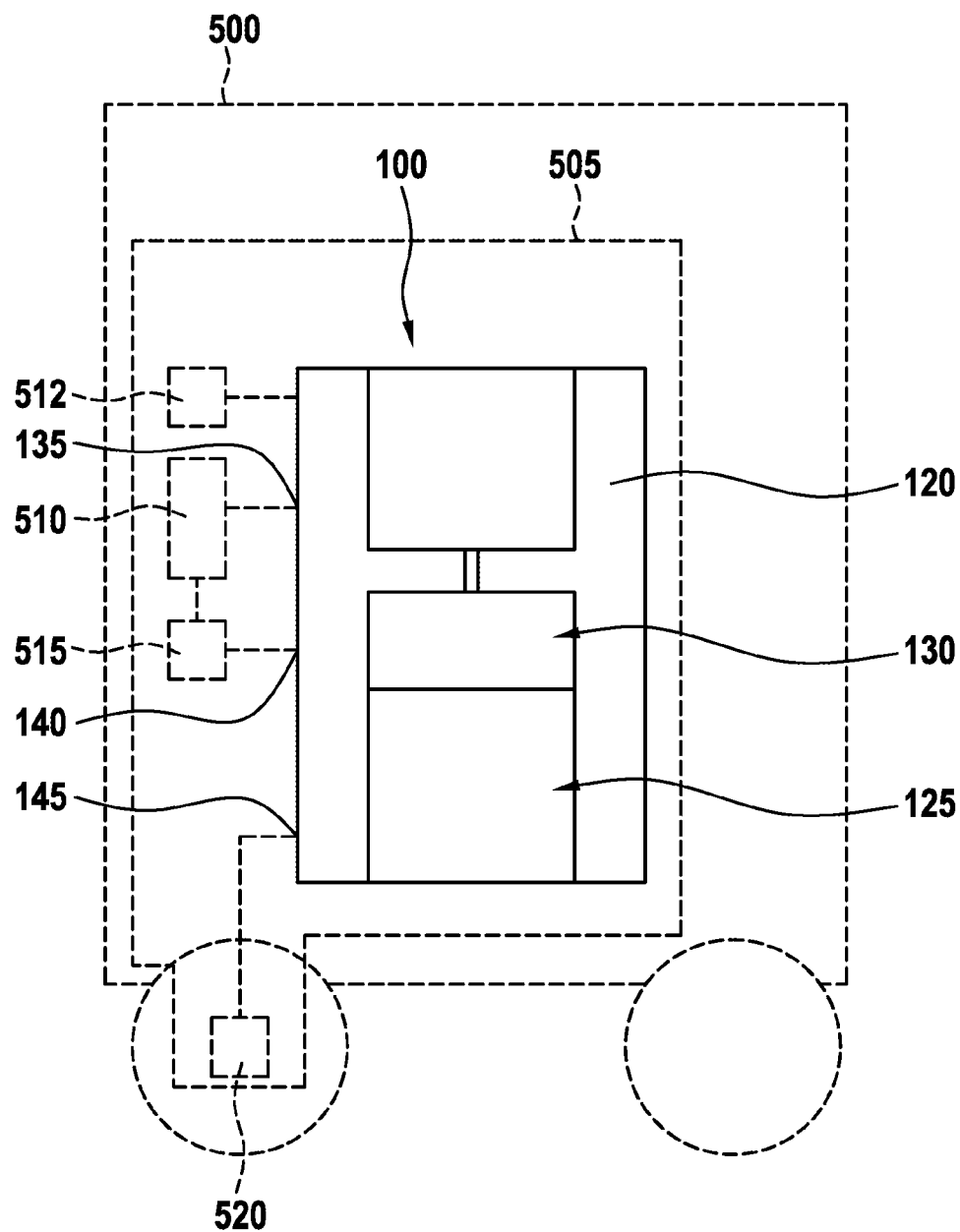
FIG. 5 shows a schematic cross-sectional illustration of a vehicle 500 having an electropneumatic modulator 100 with a guide sleeve device according to an exemplary embodiment.

FIG. 5 shows a schematic cross-sectional illustration of a vehicle 500 with an electropneumatic modulator 100 with a guide sleeve device 125 and with a relay piston 130 according to an exemplary embodiment. This may be the modulator 100 described in FIG. 1, with the guide sleeve device 125 presented in any of the preceding figures.

In this exemplary embodiment, the modulator 100 is arranged so as to be coupled into or to an electropneumatic brake system 505. In one exemplary embodiment, the brake system 505 comprises not only the modulator 100 but also a reservoir 510 for providing compressed air, a control device 512 for providing an electrical control signal, a footbrake device 515 for providing the pneumatic control signal, and/or a wheel brake device 520 for braking a wheel of the vehicle 500.

Figure 6:
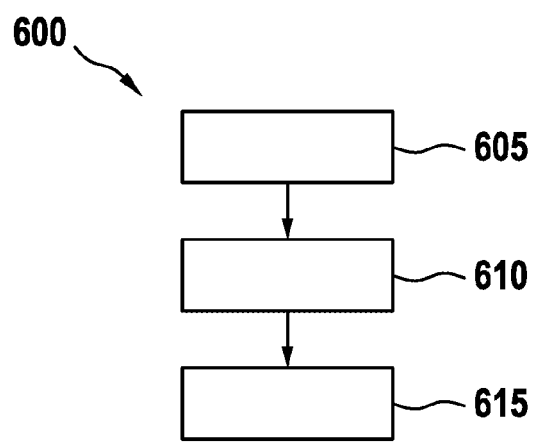
FIG. 6 shows a flow diagram of a method for producing a relay valve according to an exemplary embodiment.

FIG. 6 shows a flow diagram of a method 600 for producing a relay valve according to an exemplary embodiment. This may be the relay valve described in FIG. 1.

The method 600 comprises a step 605 of providing, a step 610 of inserting and a step 615 of introducing.

In the step 605 of providing, a housing, a relay piston and a guide sleeve device are provided. In the step 610 of inserting, the relay piston is inserted into the housing. In the step 615 of introducing, the guide sleeve device is introduced into the housing, wherein the guide sleeve device is introduced into the housing such that the guide section of the guide sleeve is coupled to the counterpart guide section of the collar, and the holding section of the guide sleeve is fastened in a positively locking manner in the housing.

In this exemplary embodiment, the step 615 of introducing is performed after the step 610 of inserting.

If an exemplary embodiment includes an "and/or" combination between a first feature and a second feature, this is to be interpreted as meaning that the exemplary embodiment, according to one embodiment, has both the first feature and the second feature and, according to a further embodiment, has either only the first feature or only the second feature.

THE LIST OF REFERENCE DESIGNATIONS IS
AS FOLLOWS

100 Electropneumatic modulator
105 Relay valve
110 Guide sleeve
115 Collar
120 Housing
125 Guide sleeve device
130 Relay piston
135 Reservoir connection
140 Pneumatic control inlet
145 Brake outlet
150 Receiving chamber
155 Guide section
160 Holding section
165 Silencer
200 External pressure
205 Central section
210 Step
215 Sealing element
220 Axial rib
225 Radial rib
230 Sleeve passage opening
235 Counterpart guide section
240 Space
245 Air flow
400 Assembly tool
405 Guide surface
500 Vehicle
505 Brake system
510 Reservoir
512 Control device
515 Footbrake device
520 Wheel brake device
600 Method for producing a relay valve
605 Step of providing
610 Step of inserting
615 Step of introducing

The invention claimed is:

1. A guide sleeve for guiding a collar of a relay valve for an electropneumatic modulator for a brake system for a vehicle, comprising:
   a guide section couple-able to a counterpart guide section of the collar of the relay valve for the electropneumatic modulator for guiding the collar along the guide section;
   a holding section to fasten the guide sleeve in a positively locking manner in a housing of the relay valve;
   wherein the electropneumatic modulator includes:
      a reservoir connection for a supply of compressed air from a reservoir;
      a pneumatic control inlet for the supply of compressed air from the reservoir in response to a pneumatic control signal; and
      a brake outlet for outputting a brake pressure to a wheel brake device,
   wherein a relay piston and the guide sleeve device are received one above the other in a receiving chamber of a housing, wherein the brake outlet and the reservoir open into the receiving chamber,
   wherein the relay valve is configured to open or close a fluidic connection between the reservoir connection and the brake outlet by a movement of the relay piston,
   wherein the receiving chamber includes a control chamber section which, controlled by the electrical control signal, is charge-able with supplied compressed air to effect a switching movement of the relay piston,
   wherein the guide sleeve is received in or on the relay valve, and the guide sleeve is configured to guide the collar of the relay valve and/or fasten the collar in the housing, wherein the guide section is couplable to or in a counterpart guide section of the collar of the relay valve for guiding the collar along the guide section, and wherein a collar spring is braced between the collar and the guide section.

2. The guide sleeve of claim 1, wherein the holding section forms at least one detent hook and/or one bayonet.

3. The guide sleeve of claim 1, wherein the guide section and the holding section extend to two opposite sides of the guide sleeve.

4. The guide sleeve of claim 1, further comprising:
   a central section which is formed between the guide section and the holding section and which is of substantially circular-ring-shaped or hollow frustoconical form.

5. The guide sleeve of claim 1, wherein the holding section extends away from an edge section of a bottom side of the central section, and/or wherein the guide section extends away from a substantially central region of a top side, arranged opposite the bottom side, of the central section.

6. The guide sleeve of claim 4, further comprising:
at least one axial rib which extends away from a bottom side, facing toward the holding section, of the central section and/or which has an extent axis which is arranged so as to run parallel to the guide section.

7. The guide sleeve of claim 4, further comprising:
at least one radial rib which extends radially between a sleeve passage opening of the guide sleeve and the holding section on a bottom side, facing toward the holding section, of the central section.

8. The guide sleeve of claim 1, wherein the guide section forms an outer sleeve and an inner sleeve which is enclosed by the outer sleeve, and wherein the inner sleeve surrounds a sleeve passage opening of the guide sleeve.

9. The guide sleeve of claim 1, wherein the guide sleeve is of unipartite and/or funnel-shaped form.

10. A guide sleeve device, comprising:
a guide sleeve for guiding a collar of a relay valve for an electropneumatic modulator for a brake system for a vehicle, including:
a guide section couple-able to a counterpart guide section of the collar of the relay valve for the electropneumatic modulator for guiding the collar along the guide section; and
a holding section to fasten the guide sleeve in a positively locking manner in a housing of the relay valve;
wherein an inner diameter of the collar is equal to or smaller than an inner diameter of the guide section of the guide sleeve;
wherein the electropneumatic modulator includes:
a reservoir connection for a supply of compressed air from a reservoir;
a pneumatic control inlet for the supply of compressed air from the reservoir in response to a pneumatic control signal; and
a brake outlet for outputting a brake pressure to a wheel brake device,
wherein a relay piston and the guide sleeve device are received one above the other in a receiving chamber of a housing, wherein the brake outlet and the reservoir open into the receiving chamber,
wherein the relay valve is configured to open or close a fluidic connection between the reservoir connection and the brake outlet by a movement of the relay piston,
wherein the receiving chamber includes a control chamber section which, controlled by the electrical control signal, is charge-able with supplied compressed air to effect a switching movement of the relay piston,
wherein the guide sleeve is received in or on the relay valve, and the guide sleeve is configured to guide the collar of the relay valve and/or fasten the collar in the housing, wherein the guide section is couplable to or in a counterpart guide section of the collar of the relay valve for guiding the collar along the guide section, and wherein a collar spring is braced between the collar and the guide section.

11. The guide sleeve device of claim 10, wherein the counterpart guide section of the collar and the guide section are formed so as to seal off a gap between the counterpart guide section and the guide section.

12. A relay valve for an electropneumatic modulator, comprising:
a housing;
a guide sleeve device, including:
a guide sleeve for guiding a collar of a relay valve for the electropneumatic modulator for a brake system for a vehicle, including:
a guide section couple-able to a counterpart guide section of the collar of the relay valve for the electropneumatic modulator for guiding the collar along the guide section; and
a holding section to fasten the guide sleeve in a positively locking manner in a housing of the relay valve;
wherein an inner diameter of the collar is equal to or smaller than an inner diameter of the guide section of the guide sleeve, and
wherein the guide sleeve device is arrangeable or arranged in the housing; and
a relay piston, which is arrangeable or is arranged in the housing, for moving the collar along the guide section of the guide sleeve;
wherein the electropneumatic modulator includes:
a reservoir connection for a supply of compressed air from a reservoir;
a pneumatic control inlet for the supply of compressed air from the reservoir in response to a pneumatic control signal; and
a brake outlet for outputting a brake pressure to a wheel brake device,
wherein a relay piston and the guide sleeve device are received one above the other in a receiving chamber of a housing, wherein the brake outlet and the reservoir open into the receiving chamber,
wherein the relay valve is configured to open or close a fluidic connection between the reservoir connection and the brake outlet by a movement of the relay piston,
wherein the receiving chamber includes a control chamber section which, controlled by the electrical control signal, is charge-able with supplied compressed air to effect a switching movement of the relay piston,
wherein the guide sleeve is received in or on the relay valve, and the guide sleeve is configured to guide the collar of the relay valve and/or fasten the collar in the housing, wherein the guide section is couplable to or in a counterpart guide section of the collar of the relay valve for guiding the collar along the guide section, and wherein a collar spring is braced between the collar and the guide section.

13. A method for producing a relay valve for an electropneumatic modulator, the method comprising:
providing a housing, a relay piston and a guide sleeve device arrangeable in the housing, wherein the guide sleeve device includes:
a guide sleeve for guiding a collar of a relay valve for the electropneumatic modulator for a brake system for a vehicle, including:
a guide section couple-able to a counterpart guide section of the collar of the relay valve for the electropneumatic modulator for guiding the collar along the guide section; and
a holding section to fasten the guide sleeve in a positively locking manner in a housing of the relay valve;
wherein an inner diameter of the collar is equal to or smaller than an inner diameter of the guide section of the guide sleeve, inserting the relay piston into the housing; and
introducing the guide sleeve device into the housing, wherein the guide sleeve device is introduced into the housing such that the guide section of the guide sleeve is coupled to the counterpart guide section of the collar and the holding section of the guide sleeve is fastened in a positively locking manner in the housing;
wherein the electropneumatic modulator includes:
- a reservoir connection for a supply of compressed air from a reservoir;
- a pneumatic control inlet for the supply of compressed air from the reservoir in response to a pneumatic control signal; and
- a brake outlet for outputting a brake pressure to a wheel brake device, wherein a relay piston and the guide sleeve device are received one above the other in a receiving chamber of a housing, wherein the brake outlet and the reservoir open into the receiving chamber,
wherein the relay valve is configured to open or close a fluidic connection between the reservoir connection and the brake outlet by a movement of the relay piston,
wherein the receiving chamber includes a control chamber section which, controlled by the electrical control signal, is charge-able with supplied compressed air to effect a switching movement of the relay piston,
wherein the guide sleeve is received in or on the relay valve, and the guide sleeve is configured to guide the collar of the relay valve and/or fasten the collar in the housing, wherein the guide section is couplable to or in a counterpart guide section of the collar of the relay valve for guiding the collar along the guide section, and wherein a collar spring is braced between the collar and the guide section.

* * * * *